W. REED.
AUTOMATIC CAR BRAKE CONTROLLING APPARATUS.
APPLICATION FILED SEPT. 24, 1913.
1,099,074.
Patented June 2, 1914.
2 SHEETS—SHEET 1.
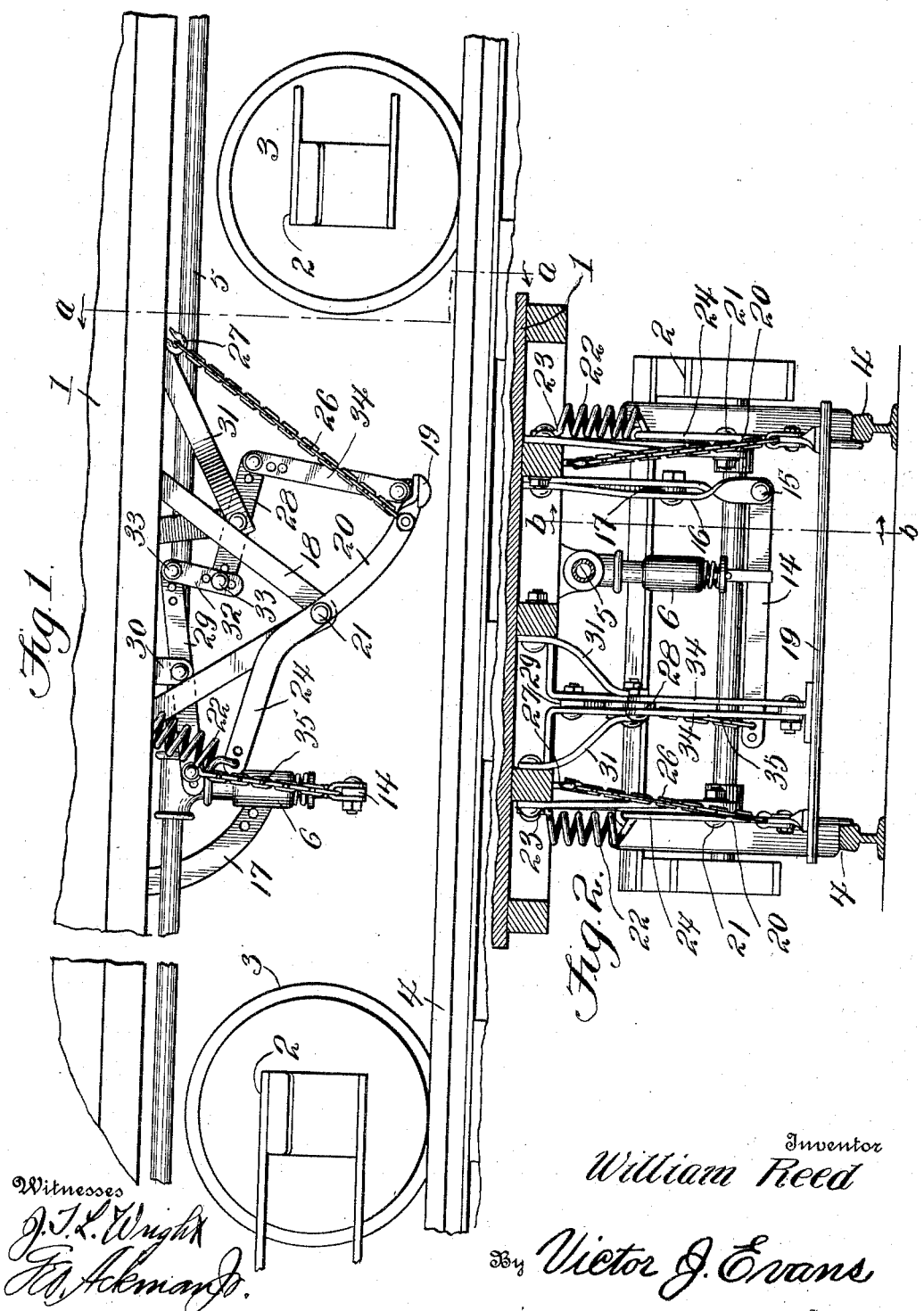
Witnesses
Inventor
William Reed
By Victor J. Evans
Attorney

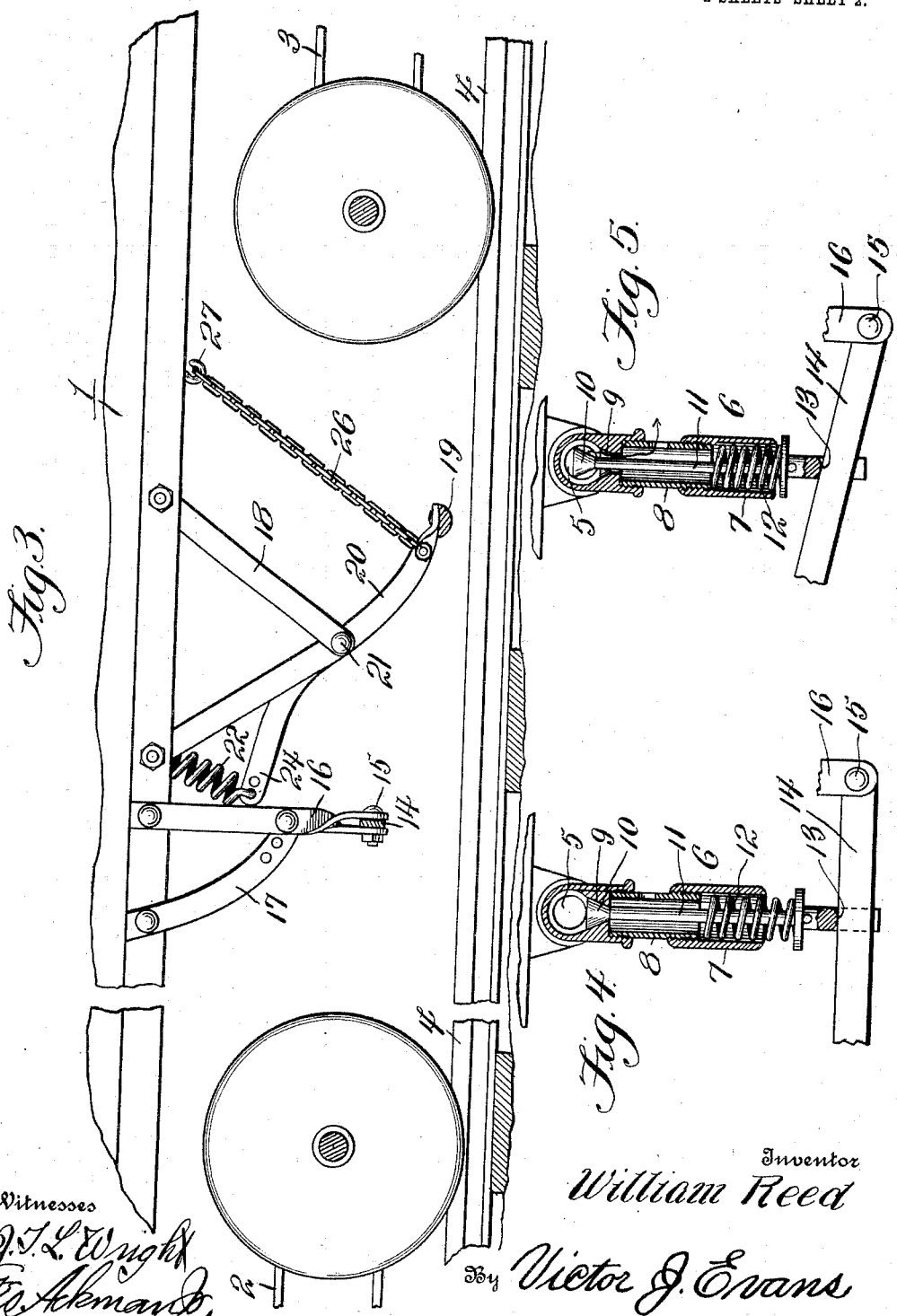

UNITED STATES PATENT OFFICE.

WILLIAM REED, OF CHILLICOTHE, MISSOURI.

AUTOMATIC CAR-BRAKE-CONTROLLING APPARATUS.

1,099,074.  Specification of Letters Patent.  Patented June 2, 1914.

Application filed September 24, 1913. Serial No. 791,629.

*To all whom it may concern:*

Be it known that I, WILLIAM REED, a citizen of the United States, residing at Chillicothe, in the county of Livingston and State of Missouri, have invented new and useful Improvements in Automatic Car-Brake-Controlling Apparatus, of which the following is a specification.

This invention is an improved automatic brake controlling apparatus for railway cars, especially freight cars, adapted to automatically cause the air brakes to be applied and the engineer to be signaled in the event that a car axle should break, a wheel flange become broken, the track spread or other accident occur which results in a derailment of one of the car trucks, the object of the invention being to provide an improved apparatus of this kind which is extremely cheap and simple which may be installed on any freight or passenger car provided with usual air brake apparatus and which is automatic in its operation in the event that a car should become derailed and thus prevent a dangerous wreck.

The invention consists in the construction, combination and arrangement of devices hereinafter described and claimed.

In the accompanying drawings: Figure 1 is a side elevation of a portion of a railway car provided with air brake controlling mechanism constructed in accordance with my invention. Fig. 2 is a vertical transverse sectional view of the same on the plane indicated by the line *a—a* of Fig. 1. Fig. 3 is a longitudinal vertical sectional view of the same on the plane indicated by the line *b—b* of Fig. 2. Fig. 4 is a detail sectional view of the relief valve and associated parts, the valve being shown closed. Fig. 5 is a similar view of the same, the valve being shown open.

A portion of the bottom of a car is indicated at 1 and portions of the front and rear trucks are indicated at 2. The wheels 3 of the truck are shown as bearing on track rails 4. The train pipe of air brake apparatus of usual form is indicated at 5.

In accordance with my invention I provide a valve 6 for relieving pressure in the train pipe and hence causing the brakes to be applied the said valve being here shown as a casing 7 including a cylinder 8 and a bleeding opening 9, and also including a plunger 10 which normally closes the said bleeding opening and has a depending rod 11, the said rod being acted upon by a spring 12 which keeps the valve normally in closed position. The lower end of the said rod is provided with a notch 13. A lever 14 engages the said notch and is pivoted at one end as at 15 to the lower end of a hanger 16 which is attached to and depends from the bottom of the car and is provided with a brace 17. A pair of hangers 18 are also provided which depend from the car. A guard or operating bar 19 is arranged above the track and is of a length somewhat exceeding the width of the track and this bar is supported by a pair of levers 20 which are fulcrumed at points intermediate their ends to the lower portions of the hangers 18 as at 21. Coiled springs 22 have their upper ends attached to the hangers as at 23 and their lower ends attached to the upper arms 24 of the levers 20 the said springs drawing upwardly on said arms and hence serving to normally hold the levers and the bar 19 in depressed position but the said bar is normally held a slight distance above the track rails by means of chains 26 the lower ends of the said chains being attached to the levers 20 and their upper ends being engaged with hooks 27 which are carried by the car.

A pair of levers 28 and 29 are respectively fulcrumed at points intermediate their ends to hangers 30 and 31 with which the car is provided. These levers are connected together by a link 32. The said link and the lever 29 are provided with adjusting openings for the reception of the pivot bolts 33 and hence they may be adjusted in respect to said levers. The lever 28 is connected by a pair of links 34 to the guard or operating bar 19 and the lever 29 is connected by a chain 35 to the lever 14.

In the event that one or both of the trucks of the car should become derailed, as the result of any accident such as the breaking of a car wheel or axle or the spreading of the track, the bar 19 will strike upon the track rail as the car drops and hence said bar will be raised and its levers 20 turned upwardly against the tension of the springs 24. The upward movement of the bar 19 causes the levers 28 and 29 to be operated so that the lever 29 will raise the lever 14 and hence said lever 14 will open the valve 6 and thereby cause the air brakes to be applied. If desired a signal cord can be attached to the bar 19 for operation thereby when the car becomes derailed.

Having thus described my invention, I claim:

1. In apparatus of the class described, the combination of a train pipe, a relief valve therefor, a spring to normally close said valve, a lever to open said valve against the tension of said spring, a guard bar, supporting levers for the guard bar, springs acting on the supporting levers to normally lower the guard bar and connections between the guard bar and the valve lever to cause the said guard bar when raised to actuate the valve lever and open the valve.

2. In apparatus of the class described, the combination of a train pipe, a relief valve therefor, a spring to normally close said valve, a lever to open said valve against the tension of said spring, a guard, supporting levers for the guard and a pair of intermediate levers connected together, one of said levers being connected to the guard and the other being connected to the valve lever.

3. In apparatus o fthe class described, the combination of a train pipe, a relief valve therefor, a spring to normally close said valve, a lever to open said valve, a guard bar, supporting levers for the guard bar, springs acting on the supporting levers to normally depress the guard bar, chains to limit the downward movement of the guard bar and connections between the guard bar and the valve lever to cause the former to operate the latter when the guard bar is raised.

In testimony whereof I affix my signature in presence of two witnesses.

WILLIAM REED.

Witnesses:
I. S. TALLY,
WILLIAM B. LANGDON.

Copies of this patent may be obtained for five cents each, by addressing the "Commissioner of Patents, Washington, D. C."